Patented Oct. 21, 1924.

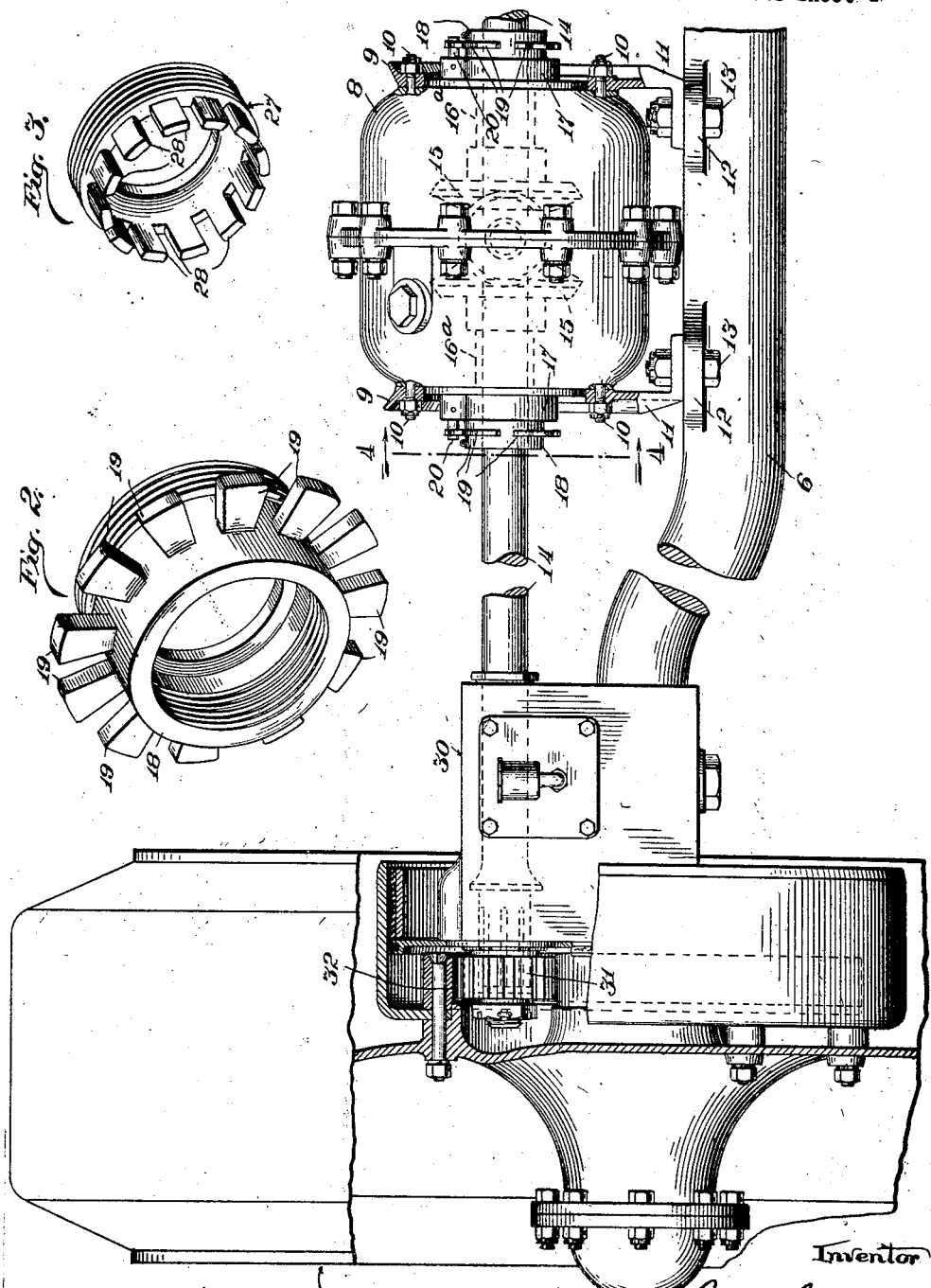

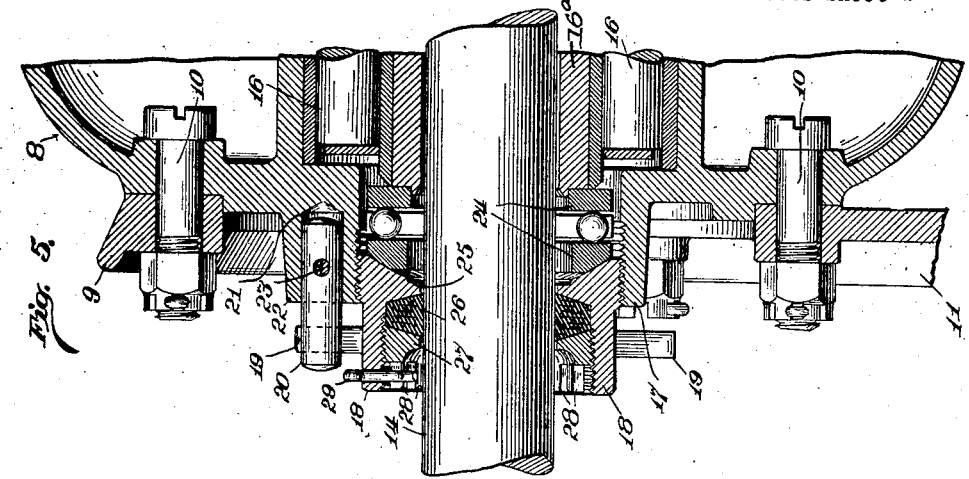

1,512,402

UNITED STATES PATENT OFFICE.

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

AXLE FOR MOTOR VEHICLES.

Application filed July 12, 1919. Serial No. 310,427.

*To all whom it may concern:*

Be it known that I, ROBERT J. BURROWS, a citizen of the United States, and a resident of Buchanan, in the county of Berrien and State of Michigan, have invented certain new and useful Improvements in Axles for Motor Vehicles, of which the following is a specification, reference being had to the accompanying drawings.

My invention relates to axles for motor vehicles, and has particularly to do with devices for adjusting the differential gearing to take up any looseness due to wear. It has for its primary object to provide improved means for making such adjustment and securing the parts in their adjusted position. A further object is to provide improved means for supporting the differential housing in an axle of the type employing a dead axle member which carries the wheels, and jack shafts for transmitting power from the differential gearing to the wheels, arranged and adapted for use in combination with such improved adjusting devices. I accomplish these objects as illustrated in the drawings and as hereinafter described. What I regard as new is set forth in the claims.

In the accompanying drawings,

Fig. 1 is a rear elevation of part of a motor vehicle embodying my improvements, some parts being in section;

Fig. 2 is a perspective view of a collar by the adjustment of which the differential gearing is adjusted;

Fig. 3 is a perspective view of a gland carried by the collar shown in Fig. 2;

Fig. 4 is an enlarged partial vertical cross-section on line 4—4 of Fig. 1; and

Fig. 5 is a vertical section substantially on line 5—5 of Fig. 4.

In the illustrated embodiment of my invention, 6 indicates the dead axle member which is provided at its ends with the usual wheel spindles on which are mounted the vehicle wheels 7, one of which is shown in Fig. 1. It will be understood that the end portions of the axle are alike, so that the parts at one end only thereof need be shown and described. 8 indicates the differential housing which is supported by the dead axle member 6 over the central portion thereof, and is securely connected therewith by means of brackets 9, the construction of which is best shown in Figs. 1 and 4. As therein shown, said brackets are principally annular in form, and are provided with pedestals 11 which fit upon laterally-projecting lugs 12 carried by the dead axle member 6, as shown in Fig. 1, so that they may be firmly secured thereto by bolts 13. The annular portions of the brackets 9 are secured to the opposite end portions of the differential housing 8 by bolts 10, as shown in Figs. 4 and 5.

14 indicates jack shafts, the inner ends of which extend into the differential housing 8 and carry gears 15 which are part of the differential mechanism, as indicated by dotted lines in Fig. 1. Between the gears 15 and the inner ends of the differential housing 8 the jack shafts 14 are supported by roller or other anti-friction bearings 16 in which are fitted endwise movable sleeves 16ª through which the jack shafts extend, which sleeves engage the outer ends of the hubs of the gears 15, as indicated by dotted lines in Fig. 1. It will be apparent, therefore, that by moving the sleeves 16ª inwardly, the gears 15 may be moved in the same direction to take up wear with the coacting gears of the differential mechanism. As shown in Figs. 1 and 5, the differential housing 8 is provided at its opposite ends with annular flanges or hubs 17 which are concentric with the axes of the jack shafts 14 and extend through the annular portions of the brackets 9. Each of these hubs is internally screw-threaded, as shown in Fig. 5, to receive an adjusting collar 18, which is externally threaded to screw into it and is provided with outwardly-projecting radial lugs 19 spaced a short distance apart, as shown in Fig. 4. 20 indicates a locking pin, the inner end of which is fitted in a socket 21 in a boss 22 carried by the hub 17, said pin being secured in said socket by a transverse cotter pin 23 which extends through the boss 22 and through said pin, as shown in Figs. 4 and 5. The outer end of the pin 20 is adapted to fit between adjacent lugs 19, as shown in Fig. 4, thereby serving to hold the collar 18 against rotation. By removing the cotter pin 23, the pin 20 may easily be removed, thereby releasing the collar 18 so that it may be screwed in or out, as desired.

24 indicates a ball bearing interposed between the inner end of the collar 18 and the outer end of the sleeve 16ª. Both the sleeve 16ª and the bearing 24 are movable longitudinally of the jack shaft 14, and therefore it will be apparent that by screwing in the collar 18 the bearing 24 and sleeve 16ª may be moved inwardly, thereby moving the gear 15 in the same direction. As said gear is keyed upon the jack shaft 14, said shaft moves with it. The inner end of the collar 18 is provided with an internally-projecting flange 25 which forms an abutment against which is fitted a washer or other suitable packing 26 adapted to be compressed by a gland 27 screwed into the collar 18, as shown in Fig. 5. This gland is best shown in Fig. 3, from which it will be seen that it is provided with a series of lugs 28 at its outer margin which are adapted to be engaged by a radially-disposed pin 29 carried by the collar 18, as shown in Fig. 5. This pin serves to lock the gland 27 in its different positions of adjustment.

The outer end portions of the jack shafts 14 extend through bearing boxes or housings 30 secured upon the outer end portions of the dead axle member 6 adjacent to the wheel spindles, and at their outer ends said jack shafts carry spur pinions 31 which mesh with driving gears 32 carried by the wheels 7. The bearing housings 30 are provided with anti-friction bearings for the outer end portions of the jack shafts, and with means for lubricating said bearings, preferably constructed as shown and described in my application for patent of even date herewith, Serial No. 310,426, and also with intermediate bearings constructed and arranged as described in my application for patent of even date herewith, Serial No. 310,425. The bearings at the outer end portions of the jack shafts are arranged to permit said jack shafts to be moved inwardly sufficiently to take up any wear on the differential gearing when the collars 18 are adjusted for that purpose.

By the construction described, the collars 18 are very securely locked in position, but may readily be released when it is desired to adjust them, and owing to the construction of the brackets 9 said collars are always readily accessible.

What I claim as my invention and desire to secure by Letters Patent, is—

1. A motor vehicle axle comprising a dead axle member, jack-shafts associated therewith and having driving pinions at their outer end portions, a differential housing mounted on said dead axle member, differential gearing in said housing comprising gears mounted on the inner end portions of said jack-shafts, bearings in said housing for said jack-shafts, sleeves movable endwise in said bearings independently thereof to adjust the gears mounted on said jack shafts, and means for adjusting said sleeves.

2. A motor vehicle axle, comprising a dead axle member, jack-shafts associated therewith and having driving pinions at their outer end portions, a differential housing mounted on said dead axle member, differential gearing in said housing comprising gears mounted on the inner end portions of said jack-shafts, bearings in said housing for said jack-shafts, sleeves on said jack shafts and axially adjustable in said bearings to adjust the gears mounted on said jack shafts, collars mounted co-axially with said sleeves and having threaded engagement with the end portions of said housing, said collars being adapted to apply inward pressure to said sleeves, and means for locking said collars against rotation.

3. A motor vehicle axle, comprising a dead axle member, jack-shafts associated therewith and having driving pinions at their outer end portions, a differential housing mounted on said dead axle member, differential gearing in said housing comprising gears mounted on the inner end portions of said jack-shafts, bearings in said housing for said jack-shafts, sleeves on said jack shafts and axially adjustable to adjust the gears mounted on said jack shafts, collars mounted coaxially with said sleeves and having threaded engagement with the end portions of said housing, radially-disposed ball bearings interposed between said collars and said sleeves, and means for locking said collars against rotation.

4. A motor vehicle axle comprising a dead axle member, jack-shafts associated therewith and having driving pinions at their outer end portions, a differential housing mounted on said dead axle member, differential gearing in said housing comprising gears mounted on the inner end portions of said jack-shafts, roller bearings in said housing for supporting the inner end portions of said jack-shafts, endwise movable sleeves on said jack shafts and abutting against said gears, said sleeves being mounted in said roller bearings, and collars fitted on said jack-shafts and screwed into the end portions of the housing, said collars being arranged to apply inward pressure to said sleeves for adjusting gears carried by said jack shafts.

5. In a motor vehicle axle, the combination with a differential housing having an axially disposed opening, of a drive shaft extending through said opening into said housing, a bearing in said housing for said shaft, differential gearing in said housing comprising a gear mounted on said shaft, a collar adjustably mounted in said opening, and means between said collar and said gear movable endwise independently of said shaft bearing for effecting adjustment of said gear by means of said collar.

6. In a motor vehicle axle, the combination with a differential housing having an axially disposed opening, of a drive shaft extending through said opening into said housing, a bearing in said housing for said shaft, differential gearing in said housing comprising a gear mounted on said shaft, a screw threaded collar adjustably mounted in said opening, means between said collar and said gear movable endwise independently of said shaft bearing for effecting adjustment of said gear by means of said collar, and means for locking said collar against rotation.

7. In a motor vehicle axle, the combination with a differential housing having an axially disposed annular flange, of a drive shaft extending through said flange into said housing, a bearing in said housing for said shaft, differential gearing in said housing comprising a gear mounted on said shaft, a collar adjustably mounted in said flange, and means between said collar and said gear movable endwise independently of said shaft bearing for effecting adjustment of said gear by means of said collar.

8. In a motor vehicle axle, the combination with a differential housing having an axially disposed opening, of a drive shaft extending through said opening into said housing, a bearing in said housing for said shaft, differential gearing in said housing comprising a gear mounted on said shaft, a sleeve movable endwise on said shaft through and independently of said shaft bearing and abutting against said gear, and means for moving said sleeve endwise comprising a collar adjustably mounted in said opening.

9. In a motor vehicle axle, the combination with a differential housing having an axially disposed opening, of a drive shaft extending through said opening into said housing, a bearing in said housing for said shaft, differential gearing in said housing comprising a gear mounted on said shaft, a sleeve movable endwise on said shaft through and independently of said shaft bearing and abutting against said gear, means for moving said sleeve endwise comprising a collar adjustably mounted in said opening, and an anti-friction bearing between said collar and said sleeve.

10. In a motor vehicle axle the combination with a dead axle member, a differential housing, and annular brackets rigidly secured to the dead axle member and detachably secured to the end portions of said differential housing, of a jack shaft extending into said differential housing through one of said brackets, differential gearing in said housing comprising a gear mounted on said shaft, a bearing in said housing for said jack shaft, a collar adjustably fitted in said housing around said shaft within the opening of said bracket, and means for effecting the adjustment of said gear by means of said collar.

11. In a motor vehicle axle, the combination with a dead axle member having wheel spindles, and a differential housing, of annular brackets rigidly secured to and rising from said dead axle member adjacent to the central portion thereof and secured to the end portions of said differential housing, drive shafts extending through said brackets into said differential housing, driving pinions at the outer end portions of said drive shafts, differential gearing connected with said drive shafts, and means adjustably connected with the end portions of said differential housing within the openings of said brackets for adjusting said differential gearing.

ROBERT J. BURROWS.

Certificate of Correction.

It is hereby certified that in Letters Patent No. 1,512,402, granted October 21, 1924, upon the application of Robert J. Burrows, of Buchanan, Michigan, for an improvement in "Axles for Motor Vehicles," errors appear in the printed specification requiring corrections as follows: Page 2, line 89, claim 3, after the word "adjustable" insert the words *in said bearings;* same page, line 113, claim 4, after the word "adjusting" insert the article *the;* and that the said Letters Patent should be read with these corrections therein that the same may conform to the record of the case in the Patent Office.

Signed and sealed this 18th day of November, A. D. 1924.

[SEAL.]

KARL FENNING,
*Acting Commissioner of Patents.*